United States Patent [19]

Buchbinder

[11] Patent Number: 5,333,382
[45] Date of Patent: Aug. 2, 1994

[54] BROW SHAVER

[75] Inventor: Ligaya H. Buchbinder, Boca Raton, Fla.

[73] Assignee: Ligaya Corporation, Boca Raton, Fla.

[21] Appl. No.: 916,655

[22] Filed: Jul. 20, 1992

Related U.S. Application Data

[63] Continuation-in-part of Ser. No. 844,105, Mar. 2, 1992, abandoned.

[51] Int. Cl.$^5$ .............................................. B26B 21/56
[52] U.S. Cl. ............................................. 30/47; 30/32
[58] Field of Search ............... 30/32, 51, 66, 67, 68, 30/69, 77, 78, 81, 346.5, 346.61

[56] References Cited

U.S. PATENT DOCUMENTS

| | | | |
|---|---|---|---|
| 987,743 | 3/1911 | Ragsdale | 30/66 |
| 2,463,442 | 3/1949 | Testi | 30/66 |
| 2,547,376 | 4/1951 | Crawford | 30/32 |
| 3,571,927 | 3/1971 | Stone | 30/51 |
| 3,703,764 | 11/1972 | Perry | 30/32 |
| 3,724,070 | 4/1973 | Dorion, Jr. | 30/47 |
| 3,777,396 | 12/1973 | Simonetti | 30/32 |
| 4,037,321 | 7/1977 | Iten et al. | 30/47 |
| 4,782,590 | 11/1988 | Pope | 30/32 |

*Primary Examiner*—Richard K. Seidel
*Assistant Examiner*—Hwei-Siu Payer
*Attorney, Agent, or Firm*—Beth Kovitz Fields

[57] ABSTRACT

A brow shaver including a handle portion and a blade complex portion is provided. The blade complex portion includes a lower holding member, a blade member, and an upper holding member. Provision is made for the flow of cut hair away from the cutting edge of the blade when the shaver is in use, thereby allowing for safe, convenient and easy operation.

19 Claims, 10 Drawing Sheets

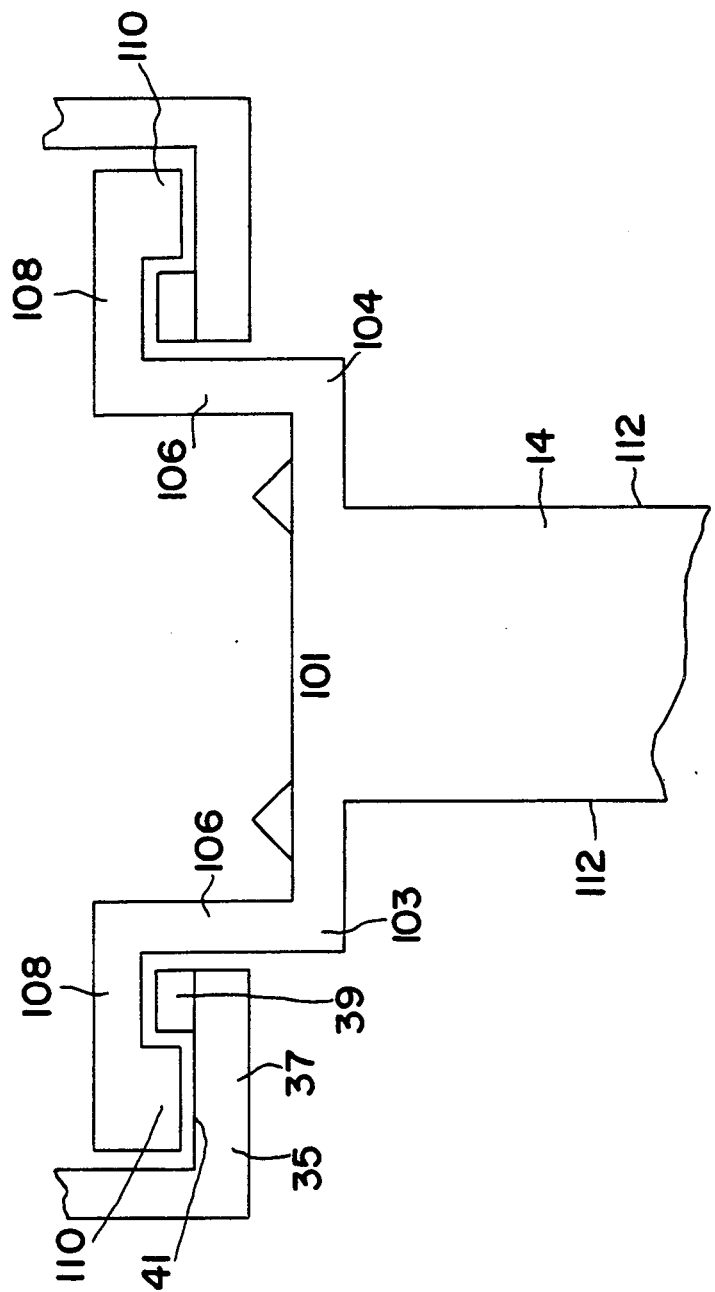

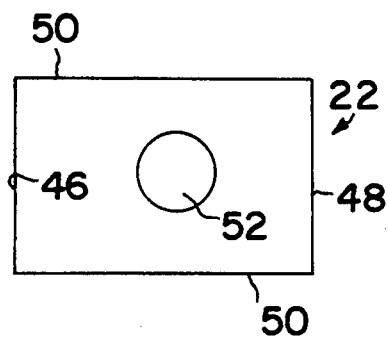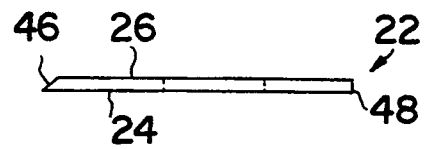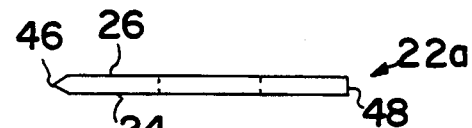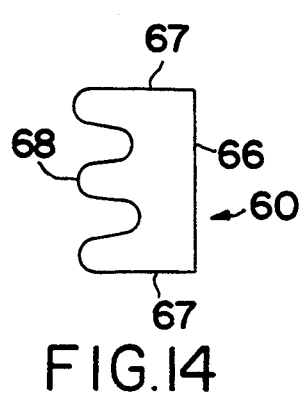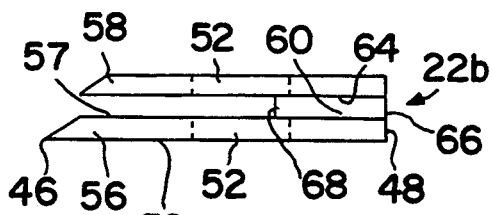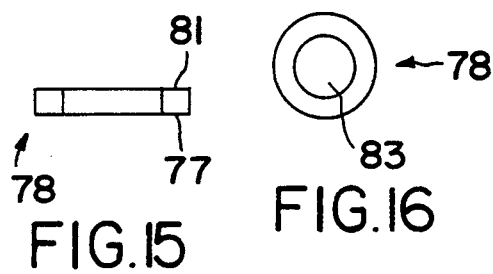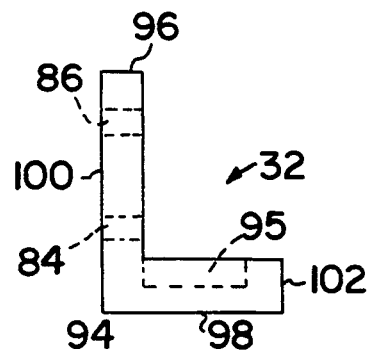

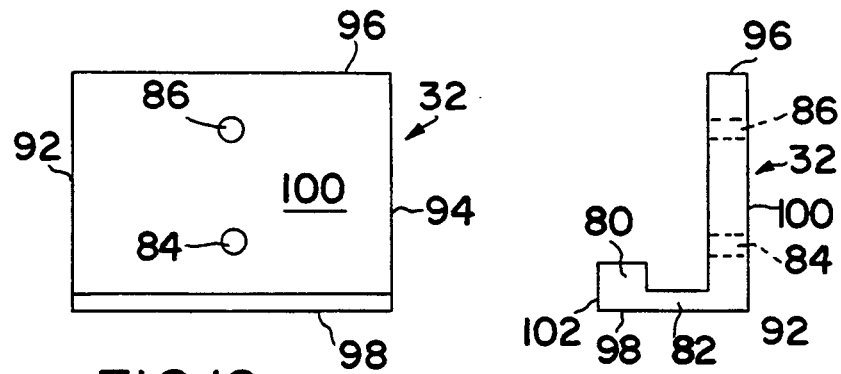
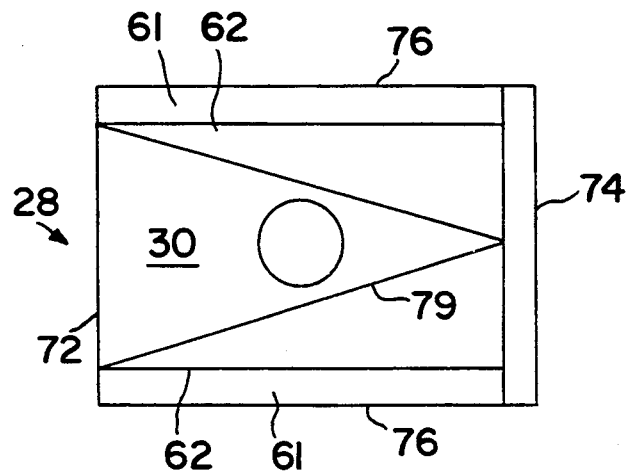
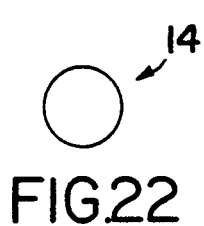
FIG.22
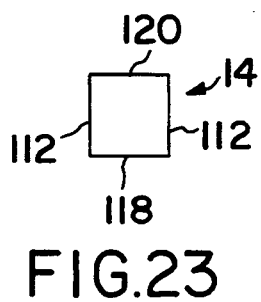
FIG.23
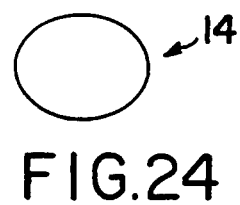
FIG.24

BROW SHAVER

This is a continuation-in-part of copending U.S. patent application Ser. No. 07/844,105 filed Mar. 2, 1992, now abandoned.

FIELD OF THE INVENTION

This invention relates generally to shavers and, in particular, to an improved shaver adapted to be used to trim eyebrows.

BACKGROUND OF THE INVENTION

The trimming of eyebrows is considered a desirable behavior characteristic in many western cultures. In particular, the desired shape and thickness of eyebrows is an appearance feature that often changes with the seasons just as hair styles or clothing styles. Accordingly, people, especially women, find it desirable to trim the eyebrows to accomplish the desired style objective.

One method for trimming the eyebrows is to pluck individual eyebrow hairs with a tweezer. This is an uncomfortable and time consuming method since each hair is removed by pulling the root of the hair from the skin.

Another widely used method for trimming eyebrows is to wax the eyebrows with hot wax. In this method, hot wax is applied to the skin along the line of the desired eyebrow shape and the wax is allowed to cool. Eyebrow hair sticks to the wax and the cooled wax and hair is ripped off the skin. This method can be painful. Furthermore, it is difficult for a person to wax their own eyebrows since it is difficult to see the desired line during application of the wax.

Eyebrow shaving is known, but is less commonly used. For example, U.S. Pat. No. 2,127,010 issued to Sampson on Aug. 16, 1938 shows a miniature eyebrow razor with relatively flat upper and lower clamping plates. A relatively flat blade is disposed between the plates and is of a slightly larger size in order to project beyond the edges of the plates to prevent obstruction of the cutting edge portion of the blade from view when the razor is in use. The blade is sufficiently narrow to enable shaving between the eyebrow and the eye without obstructing the vision of the user. The razor also includes a handle and means for holding the plates and blade to the handle.

U.S. Pate. No. 2,547,376 issued to Crawford on Apr. 3, 1951 discloses an eyebrow shaver with an elongated handle and a pair of parallel, spaced fingers that are formed with facing guideways and pointed end projections. A thin, flat blade slidably engages the guideways and has a cutting edge that extends between the outer ends of the guideways. The cutting blade is disposed inwardly of the pointed projections so that the projections can be used for depressing the skin at opposite ends of the cutting edge. The shaver also includes releasable locking means for engaging the handle and the blade in order to hold the cutting edge in position.

U.S. Pat. No. 3,106,017 issued to Milbrandt on Oct. 8, 1963 discloses an eyebrow and mustache trimmer that includes a tubular barrel, a stem mounted so as to be slideable within the barrel and a razor blade holder on one end of the stem. The razor blade can be extended from the barrel for use and is retractable into the barrel by means of a push button and a spring detent.

U.S. Pat. No. 4,514,903 issued to Pope on May 7, 1985 shows a cutter for trimming and shaping facial hair that has a relatively narrow metal blade and a fingergrip or handgrip for the blade. The blade has a honed or sharpened edge and a second opposed edge and is engaged by the fingergrip along the second edge in such a way that the sharpened edge remains exposed. The handgrip has a central segment and a pair of angled or inclined wing segments and the blade is held in an angled or inclined attitude approximating that of the handgrip. U.S. Pat. No. 4,782,590 issued to Pope on Nov. 8, 1988 is similar and discloses that the handgrip is formed in an angled or bent configuration so that the blades are held in such a way that when one blade is in use, the other blade is angled away from the face.

U.S. Pat. No. 4,961,262 issued to Lawrence on Oct. 9, 1990 shows an eyebrow shaving apparatus having an elongated handle and at least one blade mounted on a flat portion of the handle. The blades are preferably arcuate in shape and have sharp edges facing away from the flat surface of the handle. The apparatus is designed to be easily manipulated by the user and to permit the eyebrows to be trimmed while displacing the user's hands from the line of sight.

Finally, U.S. Design Pat. No. Des. 298,576 discloses an ornamental design for an eyebrow shaper razor as shown in the drawings.

There is a need for an improved brow shaver that provides a sterile blade complex that can be secured to a handle.

Accordingly, it is an object of the invention to provide an improved brow shaver.

Another object of the invention is to provide a brow shaver with a detachable blade complex that can be secured to a reuseable handle.

A further object of the invention is to provide a detachable blade complex that can be provided in a sterile condition.

Still another object of the invention is to provide a brow shaver that is convenient and easy to use.

Still a further object of the invention is to provide a brow shaver with a curved surface for contacting the concavities of the orbital rim between the eyelashes, the arched portion of the eyebrow and the nasal bridge.

Yet another object of the invention is to provide a brow shaver with a guarded blade to protect the skin from cuts as the blade is manuevered over the skin.

Yet a further object of the invention is to provide a brow shaver that is easily manueverable.

Even another object of the invention is to provide a brow shaver that provides for removal of cut hair from the blade during use.

Even a further object of the invention is to provide a brow shaver that insures a precise, close shave of the eyebrows.

Still another object of the invention is to provide a brow shaver that can be easily manufactured.

Still a further object of the invention is to provide a brow shaver wherein the blade includes an opening therethrough to allow for the egress of cut hair from the shaver.

Even a further object of the invention is to provide a brow shaver wherein the length of the blade from a cutting edge to the opposite side is greater than the width of the blade between the two perpendicular sides to allow for stability and ease of use.

Still other objects and advantages of the invention will in part be obvious and will in part be apparent from the specification.

SUMMARY OF THE INVENTION

Generally speaking, an improved brow shaver is provided in accordance with the invention. The brow shaver includes a handle portion and a blade complex portion mounted on the handle portion. The blade complex portion is mounted on the handle adjacent a lower holding member that has a lower surface adjacent the handle portion and an upper surface opposite the lower surface. A blade member with a first surface and a second surface is fixedly mounted on the lower holding member so that at least a portion of the upper surface of the lower holding member abuts the first surface of the blade member. An upper holding member with a downward surface having at least a portion that is adjacent the second surface of the blade member is also included. The dimensions of the blade member are chosen so that the distance between a razor edge and an opposing back edge is greater than the distance between the two side edges that are perpendicular to the razor edge and the back edge. In addition, the blade member has a hair egress hole therethrough to allow for egress of cut hair from the shaver.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 9 is a side plan view of a locking arrangement for locking a blade complex to a handle in a brow shaver constructed and arranged in accordance with the invention;

FIG. 10 is a top or bottom plan view of a blade member used in the brow shaver of FIG. 1;

FIG. 11 is a side plan view of a single edge blade member for use in a brow shaver constructed and arranged in accordance with the invention;

FIG. 12 is a side plan view of a double edge blade member for use in a brow shaver constructed and arranged in accordance with the invention;

FIG. 13 is a side plan view of a dual blade member having two separate blades for use in a brow shaver constructed and arranged in accordance with the invention;

FIG. 14 is a top plan view of a spacer for use in the dual blade member of FIG. 13;

FIG. 15 is a side plan view of a washer for use in a brow shaver constructed and arranged in accordance with the invention;

FIG. 16 is a top plan view of the washer of FIG. 15;

FIG. 17 is a side plan view of a screw for use in a brow shaver constructed and arranged in accordance with the invention;

FIG. 18 is a first side plan view of a securing member for use in a brow shaver constructed and arranged in accordance with the invention;

FIG. 19 is a back plan view of the securing member of FIG. 18;

FIG. 20 is a second side plan view of the securing member of FIG. 18;

FIG. 21 is a cross-sectional view of the upper holding member of FIG. 5 taken along section line 21—21 of FIG. 5;

FIG. 22 is a bottom plan view of a handle for use in a brow shaver constructed and arranged in accordance with the invention;

FIG. 23 is an alternate bottom plan view of a handle for use in a brow shaver constructed and arranged in accordance with the invention;

FIG. 24 is another alternate bottom plan view of a handle for use in a brow shaver constructed and arranged in accordance with the invention;

DETAILED DESCRIPTION OF THE PREFERRED EMBODIMENTS

Figure 1:
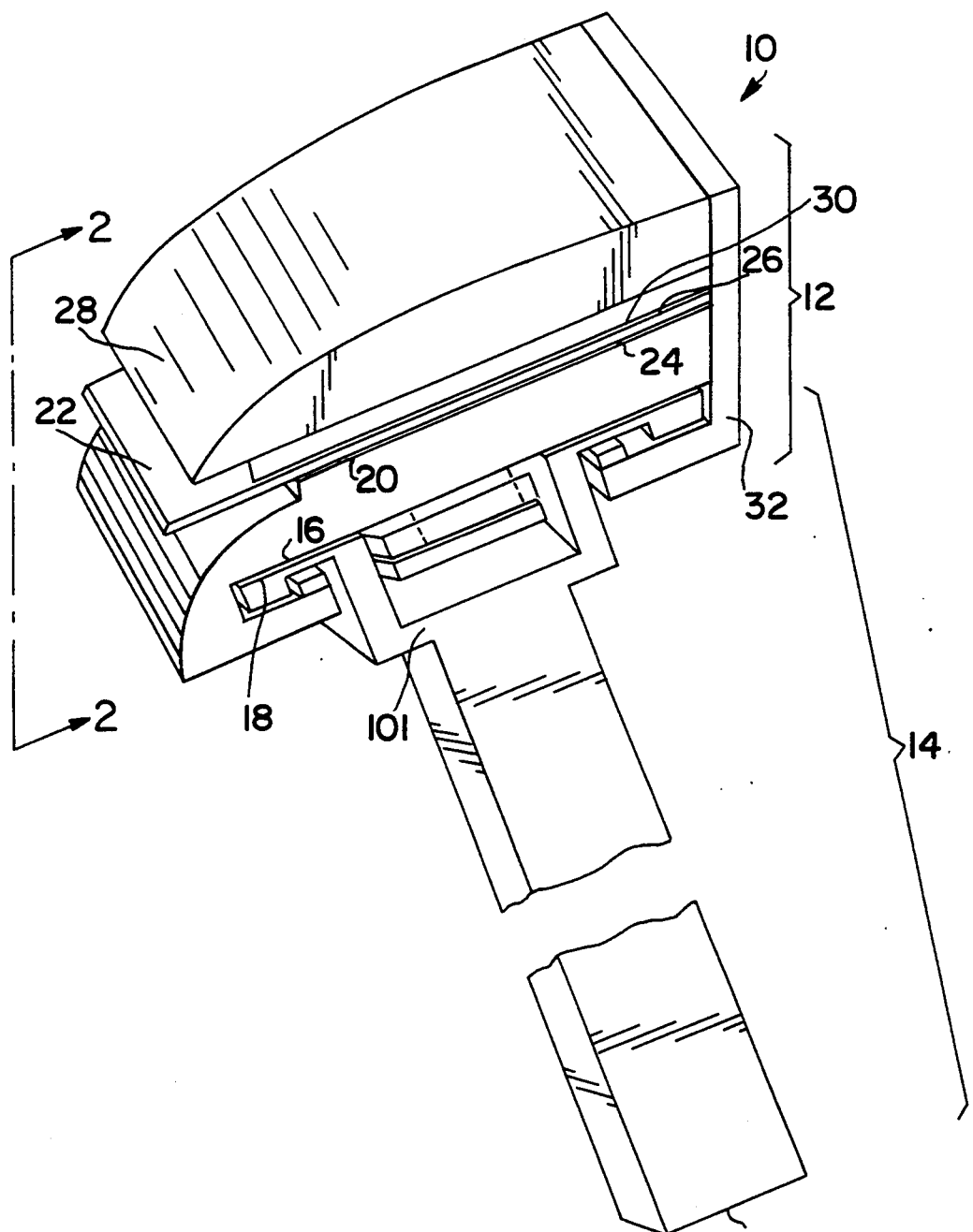
FIG. 1 is a perspective view of a brow shaver constructed and arranged in accordance with a preferred embodiment of the invention.
Figure 2:
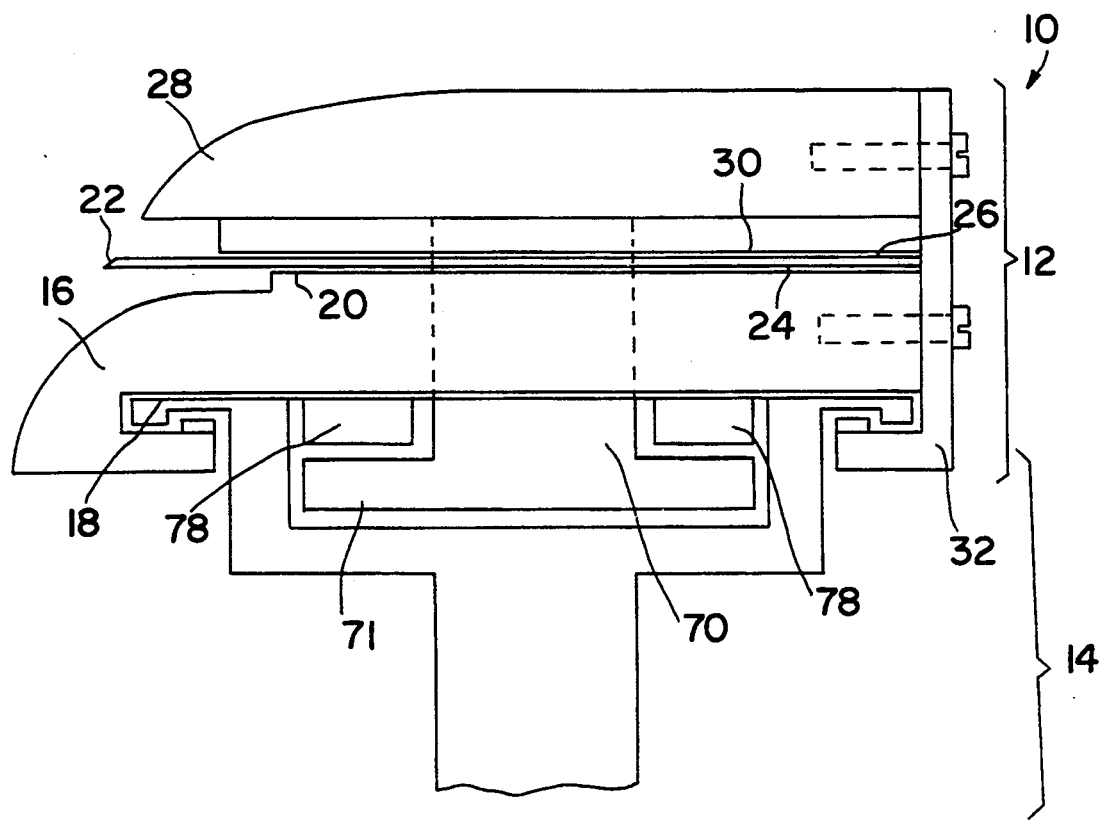
FIG. 2 is a cross-sectional view of the brow shaver taken along section line 2—2 of FIG. 1.
Figure 3:
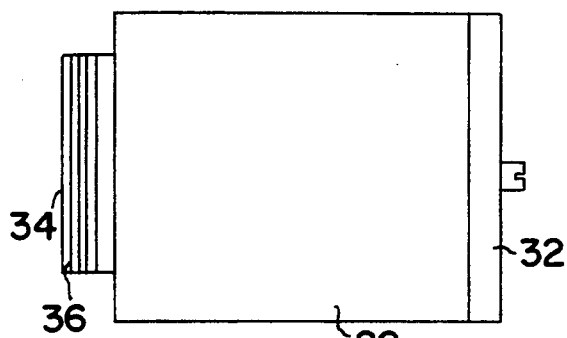
FIG. 3 is a top plan view of the brow shaver of FIG. 1.
Figure 4:
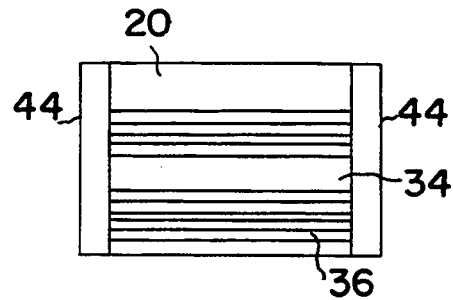
FIG. 4 is a front plan view of the brow shaver of FIG. 1.
Figure 5:
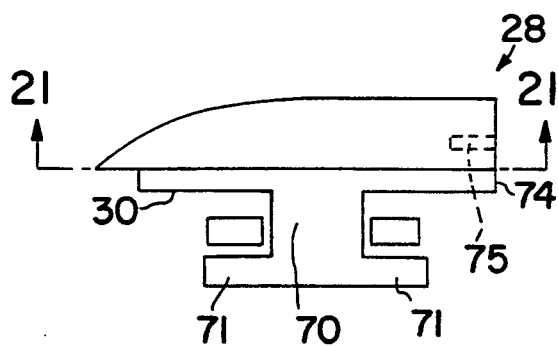
FIG. 5 is a side plan view of an upper holding member used in the construction of the brow shaver of FIG. 1.
Figure 6:
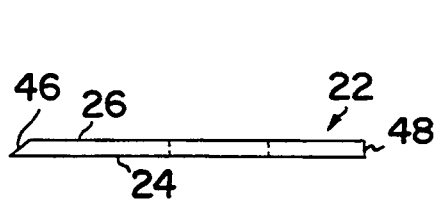
FIG. 6 is a side plan view of a blade used in the construction of the brow shaver of FIG. 1.

Reference is made to FIGS. 1 and 2 wherein a brow shaver, generally indicated as 10, constructed and arranged in accordance with a preferred embodiment of the invention is depicted. The brow shaver 10 includes a blade complex portion 12 removably secured to a handle portion 14 at an interface. The blade complex portion 12 includes a lower holding member 16 having a lower surface 18 adjacent the handle portion 14 and an upper surface 20 opposite the lower surface 18, a blade member 22 having a first surface 24 adjacent the upper surface 20 of the lower holding member 16 and a second surface 26 opposite the first surface 24, and an upper holding member 28 having a downward surface 30 adjacent the second surface 26 of the blade member 22. A securing member 32 secures the lower holding member 16, the blade member 22 and the upper holding member 28 to form the blade complex portion 12.

The entire brow shaver 10 has dimensions of between about 0.2 and 3 cm in length, between about 0.2 and 3 cm in width, and between about 0.5 and 20 cm in height. In particular, the blade complex portion 12 has dimensions of between about 0.2 and 3 cm in length, between about 0.2 and 3 cm in width, and between about 0.01 and 9.6 cm in height. The handle portion 14 has dimensions of between about 0.05 and 10 cm in length, between about 0.05 and 3 cm in width, and between about 0.0001 and 3 cm in thickness.

Figure 7:
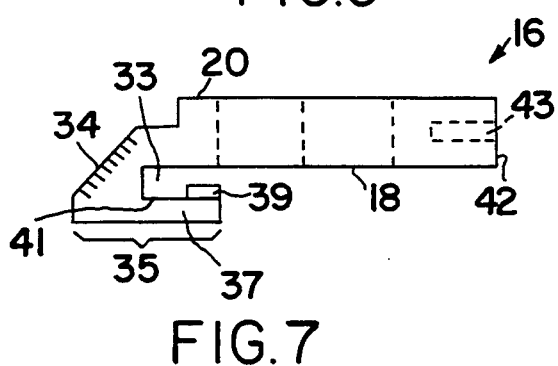
FIG. 7 is a side plan view of a lower holding member used in the construction of the brow shaver of FIG. 1.
Figure 8:
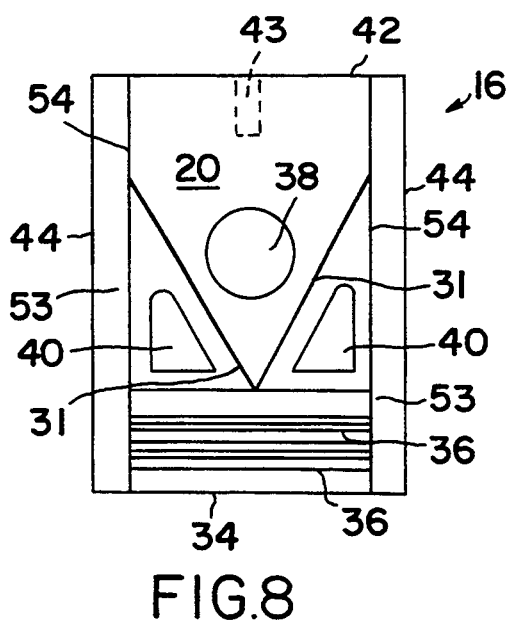
FIG. 8 is a top plan view of the lower holding member of FIG. 7.

The lower holding member 16 of the blade complex portion 14 is shown specifically in FIGS. 7 and 8. The lower holding member 16 has a rectangular cross section as seen in the top plan view of FIG. 8. It is understood that the lower holding member can be provided with any suitable geometric cross section including, but not limited to, triangular, square, arcuate or round.

An open end 34 of the lower holding member 16 is arcuate in shape, as seen primarily in FIG. 7. The arcuate open end 34 includes longitudinal ribs 36 in order to permit proper angling of the shaver 10 with respect to the hairs to be shaved. The open end 34 extends into a substantially J-shaped portion 35 including a horizontal portion 37 and an upwardly extending portion 39. This serves to form a handle reception opening 33 between an upper surface 41 of the substantially J-shaped portion 35 and the lower surface 18 of the lower holding member 16.

In addition, the lower holding member 16 includes a center hole 38 and two triangular holes 40 therethrough. The triangular holes 40 are provided for the purpose of receiving cut hair when the shaver 10 is in use. The lower holding member 16 also includes means for raising a blade so that cut hair can flow into the triangular holes 40. As shown, a raised ridge 31 is provided.

A raised side section 53 is provided between a side edge 44 and an inner side edge 54. The raised side section 53 is slightly elevated from the upper surface 20 of the lower holding member 16 and allows for disposition of a blade member 22 between the inner side edges 54. Furthermore, the raised side section 53 is elevated a bit more than the raised ridge 31 so that the cut hair is guided into the triangular holes 40. A threaded hole 43 in a closed end 42 for the purpose of receiving a screw is also provided.

The lower holding member 16 has a length measured between the open end 34 and the closed end 42 opposite the open end 34 of between about 0.2 and 3 cm, preferably about 0.6 cm. The width is measured between two sides edges 44 that join the open end 34 and the closed end 42 and is between about 0.2 and 3 cm, preferably about 0.5 cm. The height of the lower holding member 16 is measured between the lower surface 18 and the upper surface 20 and is between about 0.001 and 3 cm, preferably about 0.2 cm.

The lower holding member 16 can be formed of any suitable material including, but not limited to, plastics, metals, wood, synthetics, metal alloys, glass, stone or other compounds. In a preferred embodiment, the lower holding member is formed of plastic in a primary color or black, although any color can be used and the scope of the invention in not limited thereby.

A blade member 22 is seated on the lower holding member 16 so that raised ridge 31 provided on the upper surface 20 of the lower holding member abuts the first lower surface 24 of the blade member 22. Cross sections of suitable blade members 22 are shown in FIGS. 6, 11, 12 and 13. As shown in the drawings, a single edge blade member 22 (FIGS. 6 and 11), a double edge blade member 22a (FIG. 12) or a dual blade member 22b (FIG. 13) can be used.

The blade member 22 can have any suitable geometric cross section including, but not limited to, triangular, square, round, rectangular, and oblong. In the embodiment shown, the blade member 22 has a rectangular cross section. A circular hole 52 through the blade member 22 aligns with the center hole 38 through the lower holding member 16.

The length of the blade member 22 measured between a razor edge 46 and a covered edge 48 opposite the razor edge 46 is between about 0.2 and 3 cm, preferably about 0.3 and 0.4 cm. The width of the blade member 22 measured between two side edges 50 that join the razor edge 46 and the covered edge 48 is between about 0.2 and 3 cm, preferably about 0.3 and 0.4 cm. The blade member 22 has a thickness between the first surface 24 and the second surface 26 of between about 0.001 and 0.3 cm, preferably between about 0.003 and 0.03 cm.

The blade member 22 may be formed of stainless steel, carbon steel or any other suitable metal or compound material. The blade member 22 may be any color, but in general black, chrome or gold are preferred.

In an alternate embodiment, the blade member 22b may have multiple cutting edges. This is accomplished by stacking two or more blades 56 and 58 as shown in FIG. 13, The first stacked blade 56 has a first lower surface 59 corresponding to the first lower surface 24 of a blade member 22 that is positioned adjacent the upper surface 20 of the lower holding member 16. The first stacked blade 56 also includes an upper intermediate surface 57, a razor edge 46 and a back covered edge 48. A circular hole 52 is provided through the blade 56 in a manner similar to that shown in FIG. 10. The second stacked blade 58 has a similar configuration and a lower intermediate surface 64.

A spacer element 60 is provided between the upper intermediate surface 57 of the first stacked blade 56 and the lower intermediate surface 64 of the second stacked blade 58. The spacer element 60 can be square, round, rectangular, oblong, zig-zag or any other suitable geometric configuration. In the embodiment shown, the spacer element 60 has a back edge 66, two side edges 67 that align with the side edges 50 of the blade member 22 and a wavy inner edge 68. The maximum distance between the wavy inner edge 68 and the back edge 66 is shorter than or equal to the distance between the circular hole 52 and the covered edge 48 of the blade 56. The maximum length of the spacer element 60 measured between the back edge 66 and the wavy edge 68 is between about 0.2 and 3 cm, the width measured between the side edges 67 is between about 0.2 and 3 cm and the thickness, i.e. the distance between the upper intermediate surface 57 of the first blade 56 and the lower intermediate surface 64 of the second blade 58, is between about 0.001 and 3 cm. The spacer element can be formed of metal, plastic, a synthetic material, a metal alloy or a compound material and can be any color.

An upper holding member 28 sits atop the blade member 22 so that at least a portion of the downward surface 30 of the upper holding member lies adjacent the second upper surface 26 of the blade member 22. An extending portion 70 of the upper holding member 28 is provided to extend into the circular hole 52 through the blade member 22 and the center hole 38 through the lower holding member 16. A flange member 71 is fitted around the bottom of the extending portion 70 at the side distal the lower surface 30. This arrangement serves to partially secure the lower holding member 16, the blade member 22 and the upper holding member 28 in position within the blade complex portion 12 of the brow shaver 10. A threaded screw hole 75 is provided through the back edge 74 of the upper holding member 28.

The upper holding member 28 can have an arcuate, rectangular, square, round, or any other suitable geometric cross section as shown in the section view of FIG. 21. The upper holding member 28 has a V-shaped ridge 79 to provide a spacer for the blade member 22.

An elevated side section 61 is formed between the side edges 76 of the upper holding member 28 and inner side edges 62. The elevated side section 61 is slightly elevated from the downward edge of the upper holding member 28 to allow for the disposition of a blade member 22 therebetween. When constructed, the raised side section 53 of the lower holding member 16 abuts the elevated side section 61 of the upper holding member 28 so that the side edges 50 of the blade member 22 are not exposed.

The upper holding member 28 has a length measured between a front edge 72 and the back edge 74 of between about 0.2 and 3 cm, preferably 0.6 cm. The width is measured between the side edges 76 that join the front edge 72 and the back edge 74 and is between 0.2 and 3 cm, preferably 0.5 cm. The thickness of the upper holding member 28, not including the extending portion 70 is between about 0.005 and 3 cm, preferably about 0.5 cm.

The upper holding member 28 can be formed, for example, of plastic, metal, or any other suitable metal alloy or compound, and is preferably a plastic material. The upper holding member 28 can be any color, although a primary color or black is considered preferable.

A washer 78 is fitted between the flange 71 and the lower surface 18 of the lower holding member 16 and has an opening 83 to accomodate the extending portion 70 of the upper holding member 28. The washer is depicted as circular in FIGS. 15 and 16 but can, alternatively, be square, rectangular, triangular, oblong or any other geometric or linear variation. The washer 78 will generally have dimensions of between about 0.05 and 3 cm in diameter or, alternatively, between about 0.05 and 3 cm in width, between about 0.05 and 3 cm in length and a thickness measured between a top 81 and a bottom 77 of between about 0.001 and 2 cm. If the washer 78 is circular, the radius will generally be between about 0.03 and 3 cm. The washer 78 can be metal, plastic, wood, a synthetic material, alloy or compound and can be any color.

In the embodiment shown, the washer is round and has a radius between about 0.1 and 0.2 cm. The washer is formed of a metal or plastic material and is preferably chrome or gold in color.

A securing member 32 of a type shown in FIGS. 18, 19 and 20 further secures the lower holding member 16, the blade member 22 and the upper holding member 28 in position. The securing member 32 shown in the drawings has a rectangular appearance when viewed from the back, but can be square, arcuate, round, triangular or any other suitable geometric shape in alternate embodiments. The securing member 32 has a lower screw hole 84 and an upper screw hole 86 therethrough. The lower screw hole 84 is positioned to align with the threaded hole 43 in the lower holding member 16 and the upper screw hole 86 is positioned to align with the threaded screw hole 75 in the upper holding member 28. The securing member 32 also includes a horizontally extending portion 82 with an upwardly extending portion 80 extending upwardly therefrom to form a substantially J-shaped portion 93. The substantially J-shaped portion 93 extends the width of the securing member 32 between a first side edge 92 and a second side edge 94. At the second side edge 94, a stop 95 is provided in the J-shaped portion 93 so that the portion takes on an L-shape.

The securing member 32 will generally have a width measured between the first side edge 92 and the second side edge 94 of between about 0.005 and 3 cm, a length measured between a top edge 96 and a bottom edge 98 of between about 0.05 and 3 cm and a thickness measured between a back 100 and a forwardmost edge 102 of between about 0.002 and 3 cm. The securing member 32 can be formed of metal, plastic, a synthetic material or compound, a metal alloy or a combination of these components, but is preferably formed of plastic and is a primary color or black.

Two screws 88 and 90 of a type shown in FIG. 17 are provided. Each screw 88 can have, for example, a round, triangular, oblong, square, rectangular or polyhedral head and, for example, a tapered, spiral, cirular, triangular or rectangular point. It is, however, understood that other suitable geometric variations could be used. The length of the screw will generally be between about 0.01 and 3 cm and the width of the head will generally be between about 0.001 and 3 cm. The diameter of the screw will generally range between about 0.001 and 2 cm. The screws 88 can be formed of any suitable plastic, metal, synthetic material or compound, metal alloy or combination thereof.

In the embodiment shown, the screws 88 have a circular head with a round, spiral or tapered point. The length of the screws 88 and 90 is between about 0.1 and 0.2 cm, the outer radius of the head is between about 0.05 and 0.2 cm, the thickness of the head is between 0.01 and 0.1 cm and the radius of the point is between about 0.05 and 0.2 cm. The screws 88 and 90 are preferably formed of plastic in a primary color or black.

The lower screw 88 extends through the lower screw hole 84 through the securing member 32 and into the threaded hole 43 in the lower holding member 16. The upper screw 90 extends through the upper screw hole 86 through the securing member 32 and into the screw hole 75 in the upper holding member 28. Consequently, the blade complex 12 is maintained in position and stabilized.

The handle portion 14 is designed for attachment to the blade complex 12 and for being held by a user. The shape of the handle portion 12 can be triangular, rectangular, square, polyhedral, oblong or any other suitable geometric variation. The handle portion 14 is generally rectangular in longitudinal section as illustrated in FIG. 9 and can be, for example, circular, square or elliptical in cross-section as shown in FIGS. 22, 23 and 24, respectively.

A top 101 of the handle portion 14 forms two upside-down J-shaped members 103 and 104. Each upside-down J-shaped member 103 and 104 includes an upwardly extending portion 106, a horizontally extending portion 108 and a downwardly extending portion 110.

The handle portion has a width measured between two side edges 112 of between about 0.2 and 5 cm, a length measured between the top 101 and a bottom 116 of between about 0.5 and 10 cm and a thickness measured between a front 118 and a back 120 of between about 0.02 and 10 cm.

The handle portion can be formed of any suitable material including, but not limited to, plastic, metal, wood, a synthetic material, a metal alloy, glass, stone or other compound and can be any desired color.

Figure 25:
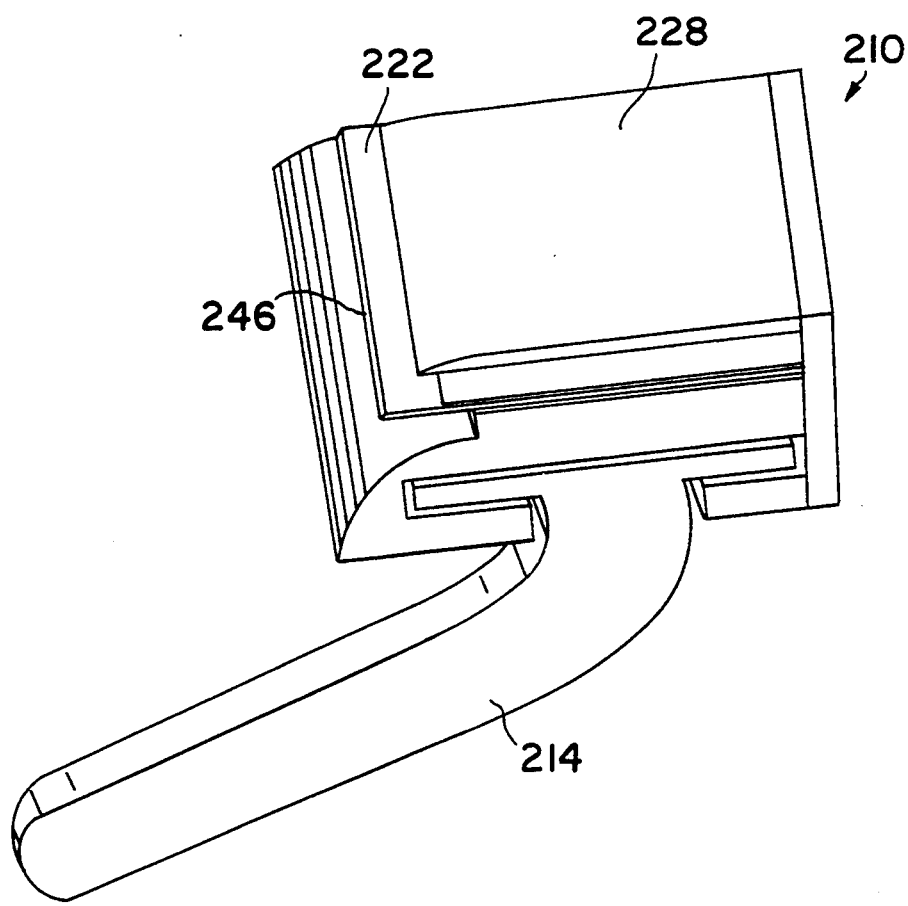
FIG. 25 is a perspective view of a brow shaver constructed and arranged in accordance with an alternate embodiment of the invention.

In an alternate preferred embodiment of the invention, a brow shaver 210 of a type shown specifically in FIG. 25 is provided. The brow shaver 210 includes a substantially flat upper holding member 228 and a curved handle portion 214. By curving the handle portion 214 in the direction of a razor edge 246 of a blade member 222, the need to curve the upper holding member in order to effect proper angling with respect to the skin is obviated. The remainder of the brow shaver 210 is substantially the same as described in connection with the brow shaver 10.

To use the brow shaver 10 of the invention, a blade complex portion 12 including a lower holding member 16, a blade member 22, an upper holding member 28, a securing member 32, a washer 78 and two screws 88 and 90 is provided. The blade complex portion 12 is preferably provided in sterile condition in individual packaging. A handle portion 14 is also provided.

The blade complex portion 12 is affixed to the handle portion 14 by interlocking the substantially J-shaped portion 35 of the lower holding member 16 and the substantially J-shaped portion 93 of the securing member 32 with the upside-down J-shaped portions 103 and 104 of the handle portion 14. Specifically, the first upside-down J-shaped member 103 of the handle portion 14 slides into tee handle reception opening 33 in the lower holding member 16 that has been created by the substantially J-shaped portion 35. The second upside-down J-shaped member 104 of the handle portion 14 slides into a similar opening in the securing member 32 created by the substantially J-shaped portion 93. The handle portion 14 slides along the full length of a track created by the substantially J-shaped portions 35 and 93 between the sides 44 of the lower holding member 16 and the sides 92 and 94 of the securing member 32. The handle portion 14 comes into contact with the stop 95 in the substantially J-shaped portion 93 at the side edge 94 when the full length of the track has been traversed. Accordingly, the brow shaver 10 is provided in accordance with the invention.

Once the brow shaver 10 has been provided, the longitudinal ribs 36 at the open end 34 of the lower holding member 16 are positioned against the skin in an area to be shaved. The blade member 22 is then used to cut the undesired hairs and the cut hairs are collected through the triangular holes 40 in the lower holding member 16. Shaving may be accomplished by shaving along an orbital lobe and beginning or ending at a nasal bridge.

The blade complex portion 12 of the shaver 10 is disposable after use and the handle portion 14 is reusable. A fresh, sterile blade complex portion 12 can be provided for each use. Alternatively, the blade complex portion 12 can be sterilized by dipping or soaking in a bactericidal or germicidal solution.

Figure 26:
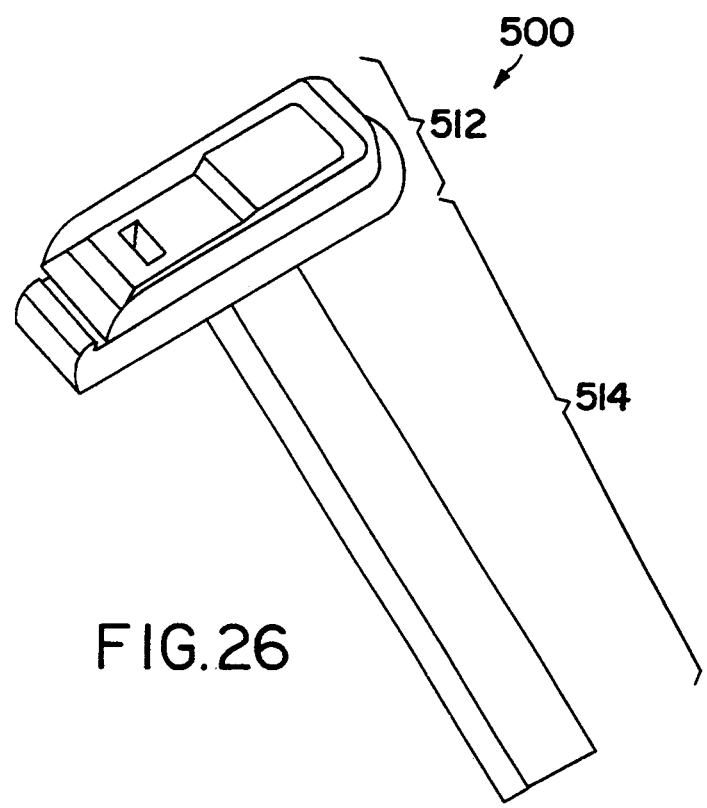
FIG. 26 is a perspective view of a brow shaver constructed and arranged in accordance with another alternate embodiment of the invention.
Figure 27:
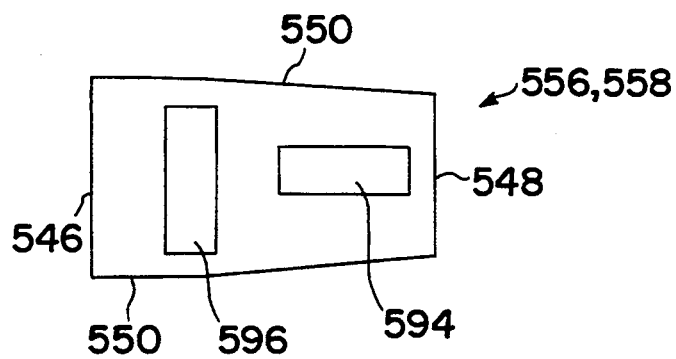
FIG. 27 is a top plan view of a blade used in the brow shaver of FIG. 26.
Figure 28:
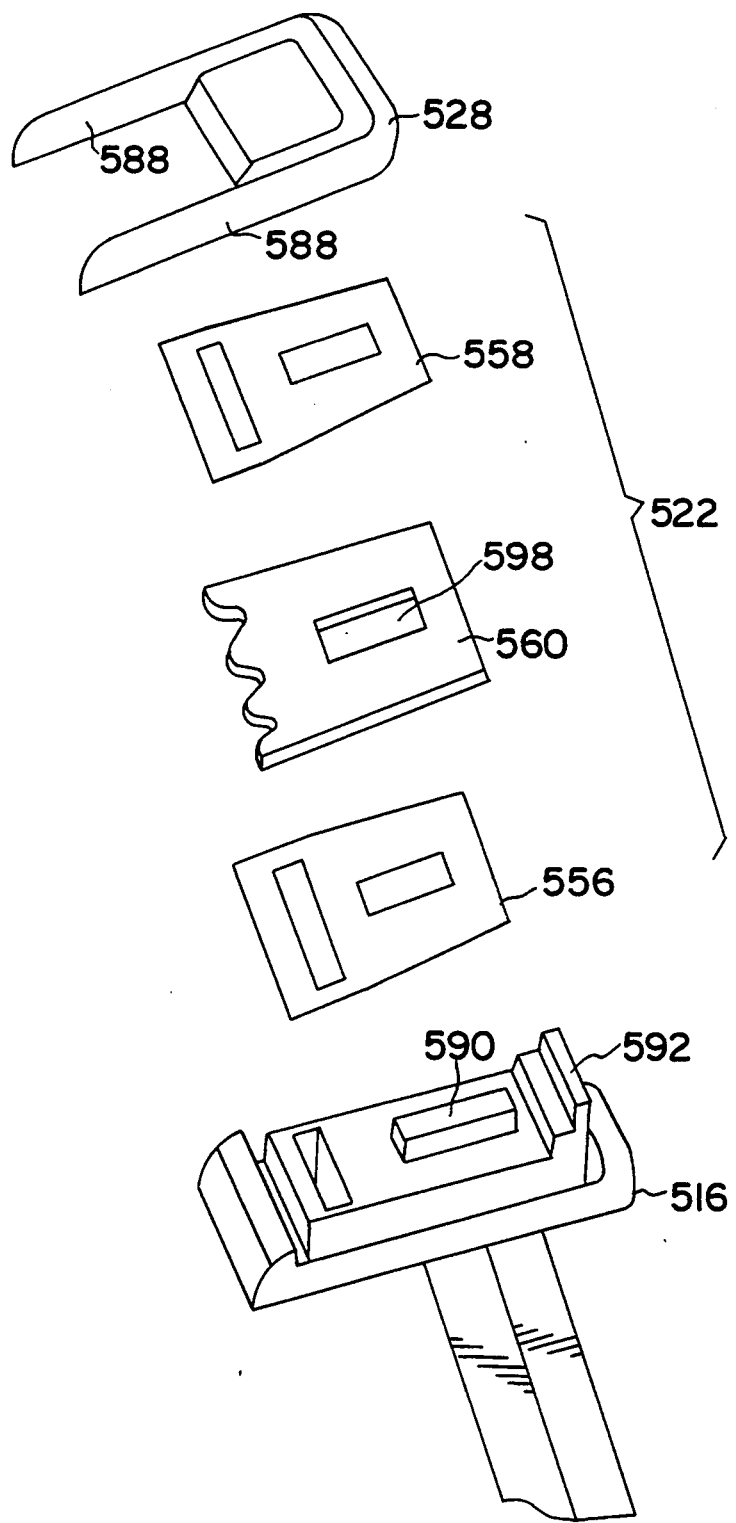
FIG. 28 is an exploded perspective view of the brow shaver of FIG. 26.
Figure 29:
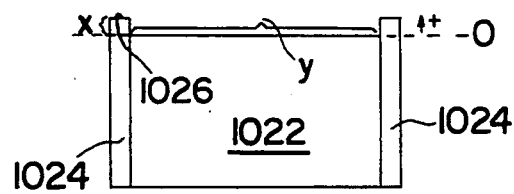
Figure 30:
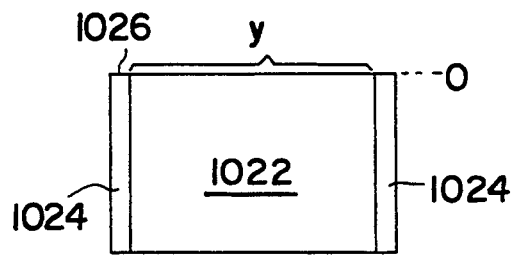
Figure 31:
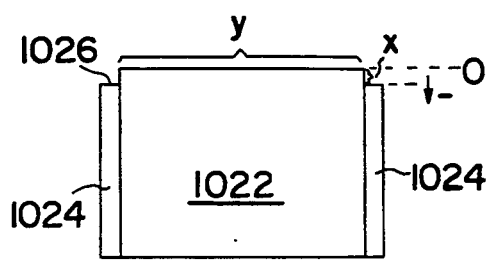
Figure 32:
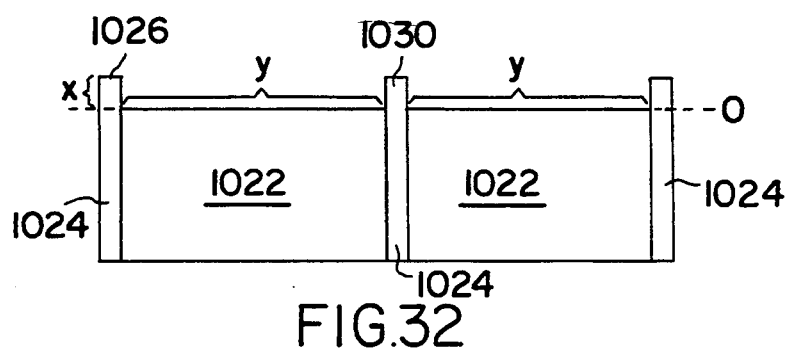

An alternate embodiment of a brow shaver 500 is depicted in FIGS. 26, 27 and 28° In this embodiment, the blade complex portion 512 and the handle portion 514 are joined. The brow shaver 500 includes a lower holding member 516, a blade member 522 including a lower blade 556 adjacent the lower holding member, a spacer element 560 adjacent the lower blade 556, and an upper blade 558 adjacent the spacer element, and an upper holding member 528 adjacent the upper blade 558.

The lower holding member 516 includes an upwardly extending alignment post 590 for accurately positioning the blades 556 and 558 and the spacer element 560 within the brow shaver 500. In addition, a securing or sealing member 592 is provided for securing the blades 556 and 558 and the spacer element 560 in position. The lower holding member 516 is preferably formed of a plastic material that can be sealed by ultrasonic or thermal means.

The blade member 522 includes two blades 556 and 558 and a spacer element 560. The blades 556 and 558 are shown specifically in FIG. 27. Each blade includes an alignment opening 594 and a hair egress opening 596 therethrough. The alignment opening 594 and the hair egress opening 596 are perpendicular to each other with the hair egress opening extending parallel to a razor edge 546 of the blades 556 and 558. The alignment opening 594 is positioned so as to align with the alignment post 590 on the lower holding member 516 when the shaver 500 is assembled.

The blades 556 and 558 also include a covered edge 548 opposite the razor edge 546 and two side edges 550. The distance between the razor edge 546 and the covered edge 548 is greater than the distance between the two side edges 550. This allows the shaver 500 to be stable and useful for its intended purpose as an eyebrow shaver.

The spacer element 560 is used to space the blades 556 and 558. An alignment opening 598 therethrough allows for proper alignment of the spacer element 560 in the brow shaver 500.

The upper holding member 528 has downwardly extending sides 588 to insure that the side edges 550 of the blade member 522 are covered. Additionally, the upper holding member is U-shaped. This leaves the hair egress openings 596 in the blades 556 and 558 uncovered to allow for the egress of cut hair during use.

To assemble the brow shaver 500, a lower holding member 516 affixed to a handle portion 514 is provided. A first stacked blade 556 is placed on the lower holding member 516 so the upwardly extending alignment post 590 of the lower holding member 516 extends through the alignment opening 594 in the blade 556. The spacer element 560 is then placed on the blade 556 so that the upwardly extending alignment post 590 of the lower holding member 516 extends through the alignment opening 598 in the spacer 560. Similarly, the second stacked blade 558 is placed on the spacer 560 so that the alignment post 590 extends through the alignment opening 594. Finally, the upper holding member 528 is snapped into position using a conventional locking mechanism. The entire assembly can then be sealed using ultrasonic vibration or thermal energy.

The brow shaver described is safe, sturdy and effective for use for its intended purpose. The blade or blades are locked in a fixed channel and secured by positioning a portion of the upper holding member through a central hole to avoid any wobbling or rocking motion of the blade during the shaving process. Accoringly, movement of the blade is precise to insure safety.

In an embodiment using two blades, the blades are arranged in a parallel fashion with one blade following the other by a fraction of a millimeter. This permits the second blade to function as a follow-through for a closer and cleaner shave.

Holes are provided in the blade complex portion to permit the egress of cut hairs during the shaving process. This prevents clogging of the blade complex and any difficulties associated therewith.

The blades are longer between the razor edge and the covered edge than between the two sides. This allows for stability of the shaper and ease of use.

The blade complex portion has a curved anterior surface for more accessible contact to the concavities of the superior orbital rim between the superior eyelashes, the arched portion of the eyebrow and the nasal bridge.

When the blade complex portion is removable from the handle portion, the blade complex portion is easily affixed and locked to the handle portion to form the brow shaver in accordance with the invention. Numerous suitable locking mechanisms for achieving this objective are available.

Finally, the length and width of the blade complex portion is conveniently narrow for easy maneuverability within the narrow distance between the upper lids and the eyebrows.

It will thus be seen that the objects set forth above, among those made apparent from the preceeding description, are efficiently attained and, since certain changes may be made in the above constructions without departing from the spirit and scop of the invention, it is intended that all matter contained in the above description or shown in the accompanying drawings shall be interpreted as illustrative and not in a limiting sense.

It is also to be understood that the following claims are intended to cover all of the generic and specific features of the invention described and all statements of the scope of the invention which, as a matter of language, might be said to fall therebetween.

What is claimed is:

1. A shaver adapted to be used to trim eyebrows comprising:
   a handle;
   a lower holding member mounted on the handle adjacent a lower surface of the lower holding member and having an upper surface opposite the lower surface and distal from the handle;
   a blade member fixedly mounted on the lower holding member along a first surface of the blade member so that the first surface of the blade member is adjacent to at least a portion of the upper surface of the lower holding member and wherein the blade member further includes a second surface opposite the first surface and distal from the lower holding member, the blade member also includes a razor edge, a covered edge opposite the razor edge and two side edges that join the razor edge and the covered edge and wherein the distance between the razor edge and the covered edge is greater than the distance between the two side edges;
   an upper holding member mounted adjacent the blade member so that at least a portion of a downward surface of the upper holding member abuts the second surface of the blade member and wherein the lower holding member, the blade member and the upper holding member form a blade complex.

2. The shaver of claim 1 wherein the lower holding member has an arcuate open end having longitudinal ribs.

3. The shaver of claim 1 wherein the blade complex is movably mounted on the handle.

4. The shaver of claim 3 wherein the lower holding member has an arcuate open end that extends into a substantially J-shaped portion that includes a horizontal portion and an upwardly extending portion that form a handle reception opening.

5. The shaver of claim 3 wherein the handle includes a top that forms two upside-down J-shaped members and wherein the handle is removably affixed to the blade complex by interlocking the upside-down J-shaped members with the blade complex.

6. The shaver of claim 1 wherein the lower holding member includes at least one hole through the upper surface for the purpose of receiving cut hair when the shaver is in use, 7. The shaver of claim 1 wherein the blade member is a single edge blade.

8. The shaver of claim 1 wherein the blade member is a double edge blade,

9. The shaver of claim 1 wherein the blade member includes two blades,

10. The shaver of claim 9 wherein the blades are separated by a spacer,

11. The shaver of claim 1 wherein the blade member and the lower holding member each have a center hole therethrough and wherein the upper holding member includes an extending portion that extends through the center hole in the blade member and the lower holding member to secure the lower holding member, the blade member and the upper holding member in position.

12. The shaver of claim 1 wherein the upper holding member includes a ridge along the downward surface to provide a spacer for the blade member.

13. The shaver of claim 1 wherein the blade complex further includes a securing member for securing the lower holding member, the blade member and the upper holding member together to form the blade complex.

14. The brow shaver of claim 1 wherein the blade complex is fixedly mounted to the handle.

15. A shaver adapted to be used to trim eyebrows comprising:
    a handle;
    a lower holding member mounted on the handle adjacent a lower surface of the lower holding member and having an upper surface opposite the lower surface and distal from the handle;
    a blade member fixedly mounted on the lower holding member along a first surface of the blade member so that the first surface of the blade member is adjacent to at least a portion of the upper surface of the lower holding member and wherein the blade member further includes a second surface opposite the first surface and distal from the lower holding member;
    an upper holding member mounted adjacent the blade member so that at least a portion of a downward surface of the upper holding member abuts the second surface of the blade member and wherein the lower holding member, the blade member and the upper holding member form a blade complex; and,
    wherein the blade complex further includes a securing member for securing the lower holding member, the blade member and the upper holding member together to form-the blade complex; and,
    wherein the upper holding member includes a screw hole and the lower holding member includes a threaded hole and wherein the securing member has an upper screw hole and a lower screw hole therethrough and is positioned so that the upper screw hole aligns with the screw hole in the upper holding member and the lower screw hole aligns with the threaded hole in the lower holding member and wherein the securing member is secured to the upper holding member and the lower holding member by placing a first screw through the upper screw hole and the screw hole in the upper holding member and a second screw in the lower screw hole and the threaded hole in the lower holding member.

16. A shaver adapted to be used to trim eyebrows comprising:
    a handle;
    a lower holding member mounted on the handle adjacent a lower surface of the lower holding member and having an upper surface opposite the lower surface and distal from the handle;
    a blade member fixedly mounted on the lower holding member along a first surface of the blade member so that the first surface of the blade member is adjacent to at least a portion of the upper surface of the lower holding member and wherein the blade member further includes a second surface opposite the first surface and distal from the lower holding member, the blade member also includes a razor edge, a covered edge opposite the razor edge and two side edges that join the razor edge and the covered edge and wherein the distance between the razor edge and the covered edge is greater than the distance between the two side edges;
    an upper holding member mounted adjacent the blade member so that at least a portion of a downward surface of the upper holding member abuts the second surface of the blade member and wherein the lower holding member, the blade member and the upper holding member form a blade complex;
    a securing member for securing the lower holding member, the blade member and the upper holding member together; and
    wherein the upper holding member includes a screw hole and the lower holding member includes a threaded hole and wherein the securing member has an upper screw hole and a lower screw hole therethrough and is positioned so that the upper screw hole aligns with the screw hole in the upper holding member and the lower screw hole aligns with the threaded hole in the lower holding member and wherein the securing member is secured to the upper holding member and the lower holding member by placing a first screw through the upper screw hole and the screw hole in the upper holding member and a second screw in the lower screw hole and the threaded hole in the lower holding member.

17. A shaver adapted to be used to trim eyebrows comprising:
    a handle;
    a lower holding member mounted on the handle adjacent a lower surface of the lower holding member and having an upper surface opposite the lower surface and distal from the handle;
    a blade member fixedly mounted on the lower holding member along a first surface of the blade member so that the first surface of the blade member is adjacent to at least a portion of the upper surface of the lower holding member and wherein the blade member further includes a second surface opposite the first surface and distal from the lower holding member, the blade member also includes a razor edge, a covered edge opposite the razor edge and two side edges that join the razor edge and the covered edge and wherein the distance between the razor edge and the covered edge is greater that the distance between the two side edges;
    an upper holding member mounted adjacent the blade member so that at least a portion of a downward surface of the upper holding member abuts the second surface of the blade member and wherein the lower holding member, the blade member and the upper holding member form a blade complex; and,
    wherein the blade complex is movably mounted on the handle; and,
    wherein the upper holding member further includes a securing member for securing the lower holding member, the blade member and the upper holding member together to form the blade complex and wherein the securing member includes a substantially J-shaped portion having a horizontally extending portion and an upwardly extending portion.

18. The shaver of claim 17 wherein a stop is provided at one end of the substantially J-shaped portion.

19. The shave of claim 17 wherein the handle includes a top that forms two upside-down J-shaped members, the lower holding member includes a substantially J-shaped portion and wherein the handle is removably affixed to the blade complex portion by interlocking the first upside-down J-shaped member of the handle with the substantially J-shaped portion of the lower holding member and the second upside-down J-shaped member of the handle with the substantially J-shaped portion of the securing member.

* * * * *